Figure 1:
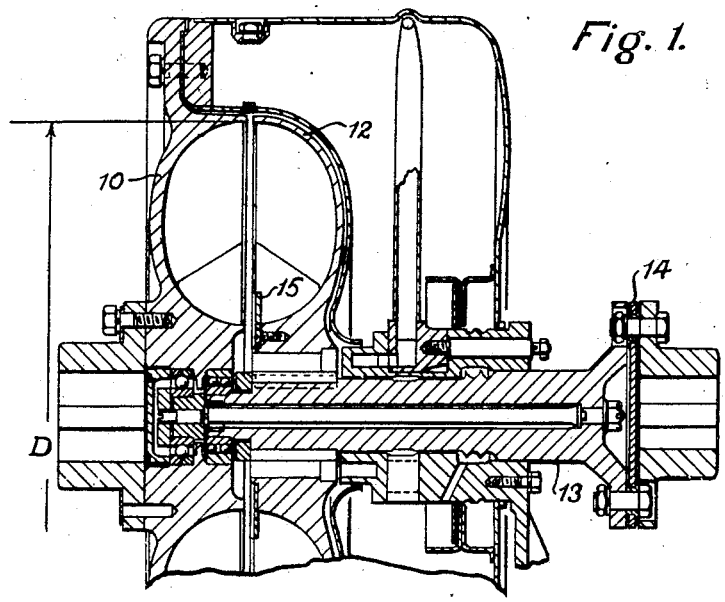

Feb. 27, 1945.   A. C. BASEBE   2,370,438
HYDRAULIC COUPLING AND BRAKE
Filed Dec. 30, 1942   2 Sheets-Sheet 1

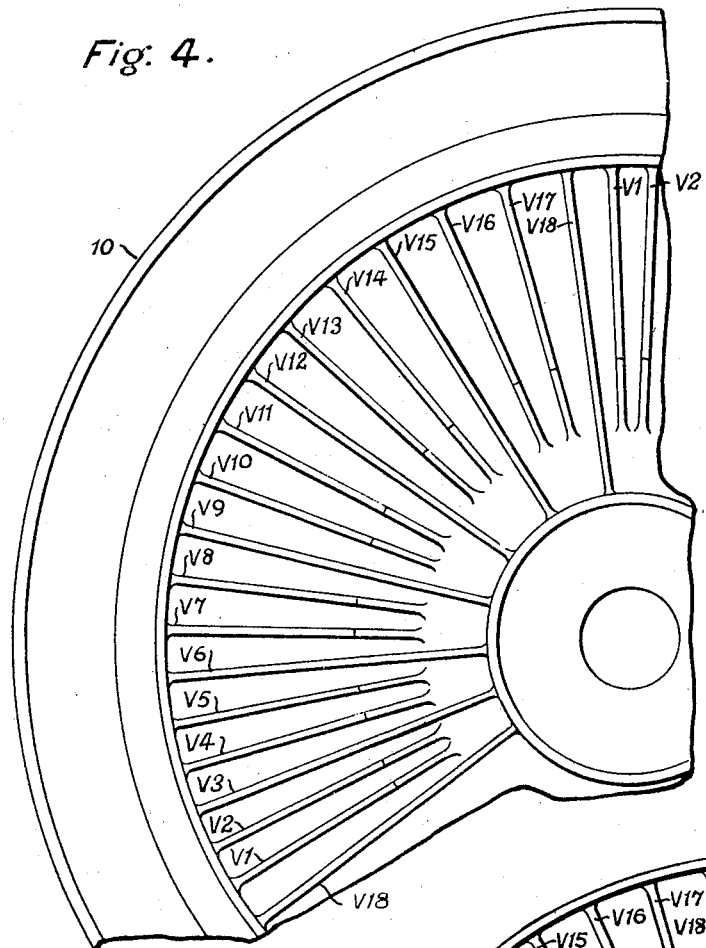
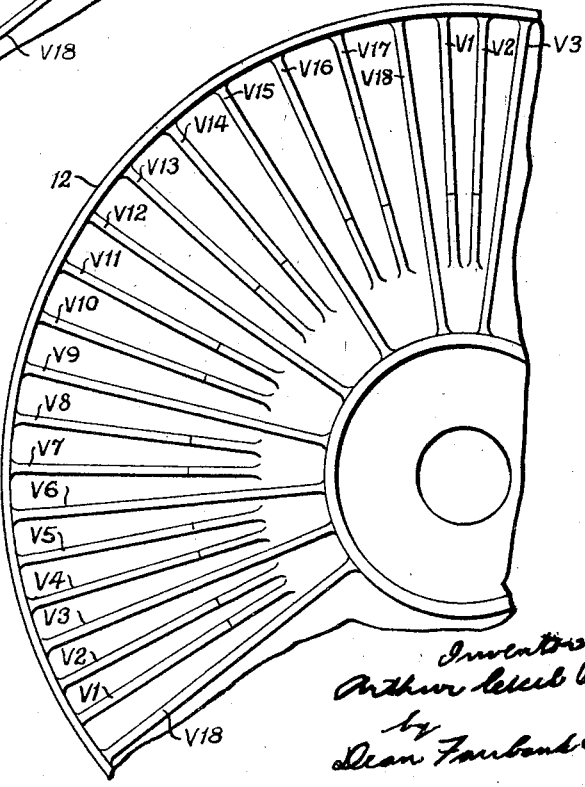

Patented Feb. 27, 1945

2,370,438

UNITED STATES PATENT OFFICE 2,370,438

HYDRAULIC COUPLING AND BRAKE

Arthur Cecil Basebe, Banstead, England, assignor to Hydraulic Coupling Patents Limited, Isleworth, England, a company of Great Britain Application December 30, 1942, Serial No. 470,577
In Great Britain January 9, 1942

6 Claims. (Cl. 60—54)

This invention relates to hydraulic couplings and brakes of the kinetic type having a primary or impeller element which is provided with vanes lying substantially in planes containing the axis of rotation of the primary element and which is placed co-axially face to face with a secondary (runner or stator) element also provided with vanes lying substantially in planes containing said axis, the passages between the vanes of the impeller and the runner or the stator together forming a working circuit for the operating liquid which, when there is relative rotation between the vaned elements, forms a vortex ring linking the two elements, and the junction between said two elements lying in a plane to which said axis is normal.

Hydraulic couplings at present in use have different numbers of vanes on the two elements in order to reduce risk of vibration. If the two elements of a coupling had the same number of vanes pitched at uniform angular intervals, while the coupling was operating all the vanes on one element would come into alignment respectively with all the vanes on the other element at the same instant, so that cyclic variations in the torque transmission capacity of the coupling, due to variation in the angular relationship of the driving and driven vanes, would occur at a frequency equal to the number of vanes on one element multiplied by the slip speed—namely the difference in the speeds of rotation of the elements. This frequency might be low enough in certain circumstances to encourage objectionable torsional vibration. Since, however, in practice, the impeller and the runner have different numbers of vanes, only a small proportion of the impeller vanes are aligned respectively with runner vanes at any instant, so that the cyclic variations in torque transmission capacity are so small and of such a high frequency that they are unobjectionable.

The provision of different numbers of vanes on the two elements of a hydraulic coupling or brake may, however, be disadvantageous from the manufacturing aspect. If the vane systems on the two elements were identical, in certain circumstances the manufacture would be cheapened. For instance if the vaned elements, or portions of them including the vanes, were die castings, or moulded in synthetic resin or like plastic material a single set of dies would serve for both parts; and in sand-casting construction the same pattern could be used for the vaned portions of both elements. In constructions employing pressings welded together, if the same number of vanes were used on each element, the same jig would serve for both sets of vanes.

The object of this invention is to provide a hydraulic coupling or brake of the type specified in which at least the numbers of vanes on the two vaned elements are identical, so that manufacture can be facilitated, and which nevertheless is not so apt to encourage vibration as an arrangement in which the two elements have the same number of vanes with equal spacing even when operating in association with an electrical generator or motor, or other machine sensitive to high-frequency torsional impulses.

According to this invention, a hydraulic coupling or brake of the type specified has the same number of vanes on the impeller element and on the runner or the stator element, and the vanes are pitched at various angular intervals about the common axis of the elements so that when the elements are face to face in operative relationship all the vanes of one of the elements never come simultaneously opposite respectively to the vanes of the other element. The impeller vane system is preferably substantially identical with the vane system of the runner or the stator. In consequence of this improved arrangement the maximum amplitude of the variations in torque transmission capacity is reduced, their number per slip revolution is increased and their periodic time is rendered irregular.

Since the hydraulic device has some inherent capacity for damping torsional oscillations, in some applications of the device only a slight reduction in the amplitude of the variations in torque transmission capacity, as compared with the amplitude variation in elementary arrangements in which the two elements have the same number of vanes, may be enough to check the occurrence of torsional oscillation; nevertheless, in view of the difficulty of dealing adequately, by theory alone, with the problem of torsional oscillations in apparatus employing hydro-kinetic devices, it is desirable to provide a substantial margin of safety. Accordingly in the preferred arrangement according to this invention the angular intervals at which the vanes are pitched are so selected that, when, in operation, any vane on one element is in alignment with any vane on the other element, a minority of the vanes on the one element are in alignment respectively with vanes on the other element. For instance, if this preferred form of the improved device has twenty-four vanes on each element, there will be no possible working relationship of the two elements, in which more than eleven vanes on one element are opposite respectively to eleven vanes on the other element.

In order to maintain symmetry for balancing purposes, the sequence of vane intervals taken around the elements may repeat, so that there are two or more identical sequences uniformly distributed around each element.

Figure 2:
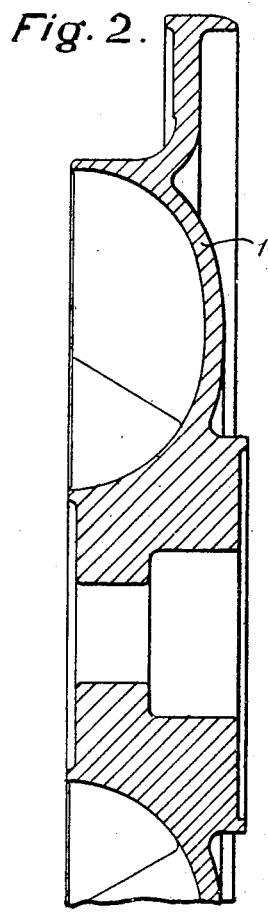
Figure 3:
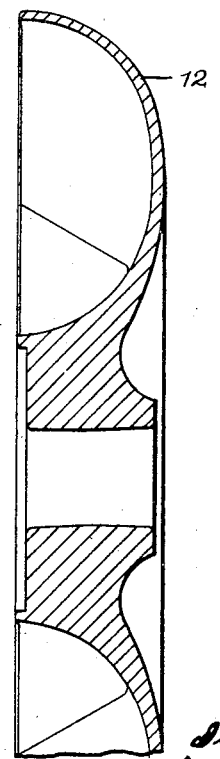

An embodiment of the invention, as applied to a hydraulic coupling of the well-known scoop-controlled type, will be described with reference to the accompanying drawings, in which:

Fig. 1 is a sectional side elevation of this improved coupling,

Figs. 2 and 3 are respectively sectional side elevations of sand castings of the impeller and the runner elements of this coupling before machining, and Figs. 4 and 5 are respectively end elevations of those castings, as viewed from the left-hand side of Figs. 2 and 3.

The hydraulic coupling shown in Fig. 1 has an outer profile diameter D of 20 inches (508 mm.). The impeller element 10 is fixed to a driving half-coupling 11 and is placed co-axially face to face with the runner element 12 which is keyed to a runner shaft 13. A flexible coupling 14 connects the runner shaft 13 to a driven machine (not shown). Each of the vaned elements 10 and 12 has fifty-four vanes. The impeller vane system is substantially identical with the runner vane system, the only difference being that the runner vanes are cut back, during the machining of the hub portion of the runner element, to accommodate a baffle plate 15. The two vane systems as cast are wholly identical, as will be clear from Figs. 2, 3, 4 and 5.

The vane intervals in each element are arranged in three identical sequences, and they will be described by reference to the lengths of arcs, measured in millimetres on a circular measure, subtended by two adjacent vanes at the outer profile. Each vaned element will accordingly have three series of vanes V1 to V18, the corresponding vanes in the three series being spaced at intervals of 120° around the axis of the element.

Thus, referring to Fig. 4, the second vane V2 of each series is spaced, clockwise around the element, at a first interval of 22 mm. from the first vane V1. Each succeeding interval of the sequence is larger by 1 mm. than the interval immediately preceding it as far as the sixteenth interval. Thus the second interval between the vanes V2 and V3 of each series will be 23 mm., and the sixteenth interval, which lies between the vanes V16 and V17, will be 37 mm. Thereafter the vane intervals decrease, being 35 mm. between vanes V17 and V18, and 25 mm. between V18 and V1 of the next succeeding series.

Fig. 5 shows that the vane arrangement of the runner casting is identical with that of the impeller casting, the only distinguishing feature between these two elevations being the peripheral flange on the impeller casting.

The improved coupling or brake may have identical die-cast vaned elements, each consisting of the vanes integral with the shell portion constituting part of the boundary of the working circuit, and with a hub portion by which the vaned element is attached to the driving or driven or fixed member. One of these die-cast vaned elements, for instance the impeller, may be fixed within a dished casing having a flange at its periphery, whereby it is attached to a dished casing shrouding and spaced from the back of the other die-cast element.

When the improved coupling is of pressed and welded or hydrogen-brazed construction, even if the impeller vanes are not identical with the runner vanes, the same jig may be employed for the welding up or brazing of the two sets of vanes, provided the number and angular distributions of the vanes are the same in the two elements.

I claim:

1. A hydraulic coupling or brake of the kinetic type having an impeller element which is provided with a number of vanes lying substantially in planes containing the axis of rotation of the impeller element and which is placed co-axially face to face with a secondary element also provided with the same number of vanes lying substantially in planes containing said axis, the junction between said two elements lying in a plane to which said axis is normal, wherein the vanes are pitched at various angular intervals about said axis, so that, when said elements are face to face in operative relationship, all the vanes of one of said elements never come simultaneously opposite respectively to the vanes of the other of said elements, the relative angular dispositions of the vanes on said impeller element being respectively identical with those on said secondary element.

2. A hydraulic coupling or brake of the kinetic type having an impeller element which is provided with a number of vanes lying substantially in planes containing the axis of rotation of the impeller element and which is placed co-axially face to face with a secondary element also provided with a vane system which is substantially identical with that of said impeller element, wherein the vanes are pitched at various angular intervals about said axis, so that, when said elements are face to face in operative relationship, all the vanes of one of said elements never come simultaneously opposite respectively to the vanes of the other of said elements.

3. In the manufacture of a hydraulic coupling or brake as claimed in claim 2, and wherein said vaned elements are castings, the use of the same pattern in the casting of identical vaned portions of said elements.

4. A hydraulic coupling or brake of the kinetic type having an impeller element which is provided with a number of vanes lying substantially in planes containing the axis of rotation of the impeller element and which is placed co-axially face to face with a secondary element also provided with the same number of vanes lying substantially in planes containing said axis, the junction between said two elements lying in a plane to which said axis is normal, wherein the vanes are pitched at various angular intervals so selected that, when, in operation, any vane on one of said elements is in alignment with any vane on the other of said elements, a minority of the vanes on said one element are in alignment respectively with vanes on said other element, said intervals on said impeller element being identical respectively with those on said secondary element.

5. A hydraulic coupling or brake of the kinetic type having an impeller element which is provided with a number of vanes lying substantially in planes containing the axis of rotation of the impeller element and which is placed co-axially face to face with a secondary element also provided with the same number of vanes lying substantially in planes containing said axis, the junction between said two elements lying in a plane to which said axis is normal, wherein the vanes are pitched at various angular intervals about the common axis of said elements so that, when said elements are face to face in operative relationship, all the vanes of one of said elements never come simultaneously opposite respectively to the vanes of the other of said elements, and wherein the sequence of vane intervals taken around said elements repeats, so that there are a plurality of identical sequences uniformly distributed around each of said elements, the relative angular dispositions of the vanes on said impeller element being respectively identical with those on said secondary element.

6. A hydraulic coupling or brake of the kinetic type having an impeller element which is provided with a number of vanes lying substantially in planes containing the axis of rotation of the impeller element and which is placed co-axially face to face with a secondary element also provided with the same number of vanes lying substantially in planes containing said axis, the junction between said two elements lying in a plane to which said axis is normal, wherein the vanes are pitched at various angular intervals so selected that, when, in operation, any vane on one of said elements is in alignment with any vane on the other of said elements, a minority of the vanes on said one element are in alignment respectively with vanes on said other element, and wherein the sequence of vane intervals taken around said elements repeats, so that there are a plurality of identical sequences uniformly distributed around each of said elements, said intervals on said impeller element being identical respectively with those on said secondary element.

ARTHUR CECIL BASEBE.